Patented June 5, 1934

1,962,051

UNITED STATES PATENT OFFICE 1,962,051

PROCESS FOR WORKING UP GAS PURIFYING MASSES

Joseph-Arnold Bordo, Essen, Germany, assignor to the firm Vereinigte Stahlwerke Aktiengesellschaft, Dusseldorf, Germany No Drawing. Application July 8, 1932, Serial No. 621,513. In Germany July 18, 1931

1 Claim. (Cl. 23—228)

This invention relates to a process for recovering sulfur from spent gas purifying masses.

In the purification of large quantities of gas with gas purifying masses, such considerable amounts of spent purifying mass are obtained that it appears economical to work them up for the recovery of the sulphur contained therein.

In order to isolate the sulphur the masses can be extracted with organic solvents such as carbon disulphide. In this method of operation however the solution contains in addition to sulphur, organic constitutents such as for example, tar, which contaminate the sulphur separated out during the subsequent distillation and render it unsaleable. It is therefore necessary to remove the organic impurities from the solutions and for this purpose recourse is advantageously had to a treatment with sulphuric acid. In such case however, small amounts of sulphur dioxide are formed which then are partly transferred to the solvent; considerable quantities in fact passing over in the presence of small amounts of water. If the solution be thereupon distilled off in iron apparatus for liberating the sulphur, the sulphur dioxide as such, has such a powerful corrosive action on the apparatus that it renders it useless after a short time.

The present invention contemplates a process according to which the aforesaid drawbacks are obviated. The process is based on the fact that the sulphur dioxide can be removed from the extract of the purifying mass obtained with an organic solvent and treated with sulfuric acid prior to distillation by decomposing it, using for this purpose an agent which attacks neither the apparatus nor the solvent and which does not contaminate the sulphur obtained.

In order to achieve this object according to the present invention the sulfur is extracted by a solvent from the gas-purifying mass, and the extracted solution is treated with sulphuric acid and then with hydrogen sulfide to decompose the sulfur dioxide produced during the sulfuric acid treatment. The sulphur liberated from the sulphur dioxide is then recovered together with the remaining sulphur by distilling off the solvent.

It is thus possible, by means of the process of the present invention, to recover sulphur from gas purifying masses economically and to avoid corrosion difficulties completely.

Instead of employing pure sulphuretted hydrogen, it is also possible to employ coke oven crude gas containing sulphuretted hydrogen, which has been freed from impurities, more particularly tarry constituents, for the reaction with the sulphur dioxide.

It is moreover advantageous to carry out the reaction under a slight pressure and whilst stirring the liquid.

Instead of introducing sulphuretted hydrogen into the solution it is also possible to treat the solvent containing sulphur dioxide, with an aqueous solution of sulphuretted hydrogen and it is also possible in this manner to decompose the sulphur dioxide completely.

Example 1

250 cc. of a cloudy carbon disulphide extract of a spent gas purifying mass, which had an intense brown colour due to organic impurities and contained about 33% of sulphur and which had been treated with strong sulphuric acid for the purpose of removing the organic impurities was separated from the sulphuric acid layer by running off the latter after stirring several times and allowing the impurities collecting at the bottom to settle again. The sulphuric acid layer can also be separated from the carbon disulphide layer by drawing off the latter, since the sulphuric acid is not completely consumed in one operation, but can be employed several times for purification and advantageously remain in the purifying vessel. After treating the carbon disulphide extract with a sulphuric acid the now clear and light yellow coloured carbon disulphide extract contained 0.1654% sulphur dioxide. In order to remove the sulphur dioxide the carbon disulphide extract was very intimately mixed for a short time with 200 to 250 cc. of a saturated aqueous solution of sulphuretted hydrogen. After separation of the layers, the carbon disulphide exhibited a neutral reaction. The sulphur dioxide was completely decomposed and after separating off the layer of water, the distillation of the carbon disulphide extract could be carried out without difficulty. The sulphur obtained was golden yellow and odourless.

Example 2

Since the sulphur dioxide content of the carbon disulphide extract treated with sulphuric acid can vary within rather wide limits 250 ccs. of the same were mixed with 25 ccs. of water in order to increase its receptivity for sulphur dioxide. This mixture was saturated with sulphur dioxide by introducing this gas. As was ascertained by titration 1 cc. of the carbon disulphide layer contained 0.0096 grm. of SO₂ and 1 cc. of the water layer contained 0.032 grm. of SO₂. The total amount of the mixture therefore contained 250×0.0096+25×0.032=3.20 g SO₂. By introducing sulphuretted hydrogen into this mixture the entire quantity of sulphur dioxide was destroyed after a short time, which was ascertained by testing both layers. No sulphur dioxide could be found in either of the two layers whilst only traces of hydrogen sulphide could be detected in the aqueous layer by testing with cadmium acetate. The further treatment was carried out in the manner set forth in Example 1.

I claim:—

A process for recovering sulfur from spent gas-purifying masses which comprises extracting the sulfur from the purifying mass by a solvent, treating the extracted solution with sulfuric acid, and then with hydrogen sulfide to decompose the sulfur dioxide produced during the sulfuric acid treatment.

JOSEPH-ARNOLD BORDO.